United States Patent [19]

Goodfellow

[11] Patent Number: 4,555,287

[45] Date of Patent: Nov. 26, 1985

[54] METHOD FOR BUILDING TIRES

[75] Inventor: Anthony G. Goodfellow, Maghull, England

[73] Assignee: W & A Bates Ltd., London, England

[21] Appl. No.: 619,182

[22] Filed: Jun. 11, 1984

[30] Foreign Application Priority Data

Jun. 29, 1983 [GB] United Kingdom ............... 8317687

[51] Int. Cl.$^4$ ..................... B29H 17/02; B29H 17/37
[52] U.S. Cl. .................................. 156/127; 152/548; 152/558; 156/129; 156/130.3; 156/130.7; 156/406.2
[58] Field of Search ............ 156/127, 126, 129, 128.6, 156/130.3, 130.7, 123, 406.2, 110.1, 415, 111, 244.11, 244.13; 152/356 R, 361 R, 354 R

[56] References Cited

U.S. PATENT DOCUMENTS

| | | | |
|---|---|---|---|
| 2,822,027 | 2/1958 | Hollis | 156/127 |
| 2,974,714 | 3/1961 | Kraft | 156/127 |
| 3,160,545 | 12/1964 | Burton | 156/415 |
| 3,485,692 | 12/1969 | Frazier | 156/123 |
| 3,677,852 | 7/1972 | Fleuret | 156/127 |
| 3,740,293 | 6/1973 | Jones et al. | 156/127 X |
| 3,767,509 | 8/1973 | Gazuit | 156/415 |
| 4,007,069 | 2/1977 | Takayanagi | 156/123 |
| 4,152,186 | 5/1979 | Shibata | 156/123 |
| 4,392,899 | 7/1983 | Bertoldo | 156/127 |

FOREIGN PATENT DOCUMENTS 1560920 2/1980 United Kingdom .

Primary Examiner—Edward Kimlin
Assistant Examiner—Thomas Bokan
Attorney, Agent, or Firm—Stevens, Davis, Miller & Mosher

[57] ABSTRACT

A method and apparatus for use at the stage of a radial tire building process at which a tread and breaker, and sidewall rubbers, are added to the expanded carcass. A tread assembly is built, comprising tread rubber breaker and sidewall rubbers and is then located around the carcass which is then expanded into the tread assembly. A tread assembly former has a central portion expansible to bring side portions to a frusto-conical shape.

4 Claims, 18 Drawing Figures

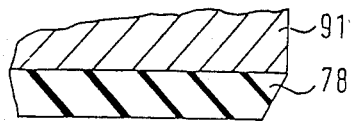
FIG.13
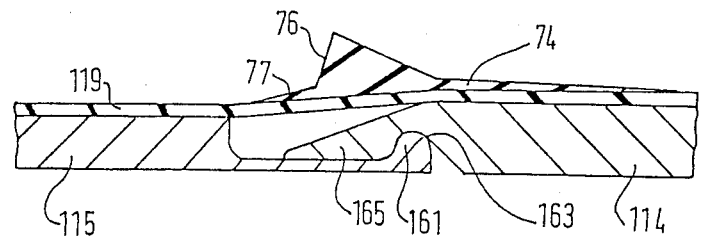
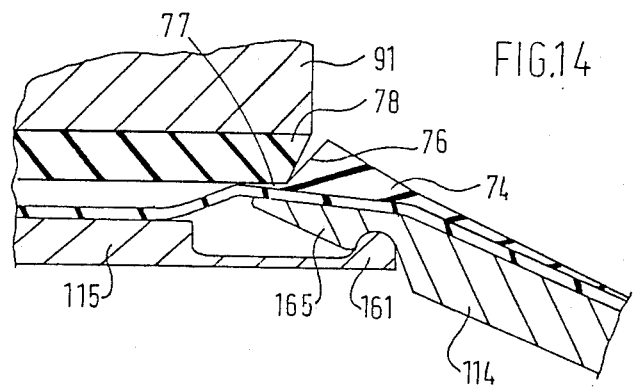
FIG.14
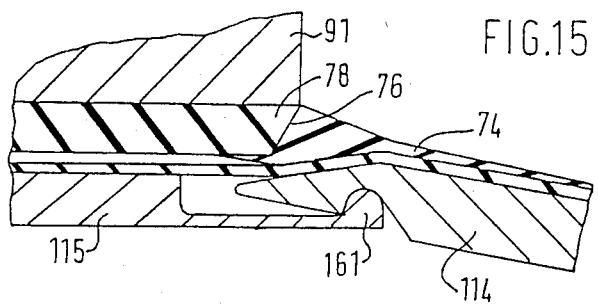
FIG.15

METHOD FOR BUILDING TIRES

This invention relates to machinery for the manufacture of pneumatic tire(s).

In the manufacture of radial tires, i.e. tire(s) in which the carcass cords extend in generally axial planes from bead wire to bead wire and the tread region of the tire(s) is reinforced by a relatively inextensible rigid reinforcement layer or "breaker", the breaker is normally applied to the tire(s) carcass after the carcass has been shaped to toroidal form. This is because the cords in breakers for radial tire(s) make low angles with the circumferential direction of the tire(s) and it is not possible to apply a breaker to the carcass in the original cylindrical form of the carcass since such breakers cannot be stretched sufficiently to permit the cylindrical carcass subsequent to be shaped, by expansion or its central region, into toroidal form.

In the construction of radial tire(s) one known method of constructing the breaker is to wrap layers of rubberized cord breaker plies directly on to the carcass after the carcass has been shaped to toroidal form; alternatively, the breaker structure may be made in cylindrical form on a separate breaker building drum and subsequently gripped in a transfer ring which is then positioned around the unshaped carcass, the carcass then being shaped into the breaker. In both methods sidewall rubbers are applied to the shaped carcass after the breaker or the tread and breaker have been placed in position on the carcass, or the sidewall rubbers may be already on the unshaped carcass.

The present invention has the object of providing an improved method and apparatus for building radial tire(s), lending itself to automatic production of tire(s).

According to one aspect of the invention a method of building a pneumatic tire(s) comprises separately building an unexpanded carcass assembly and an annular tread assembly comprising tread rubber, breaker reinforcement and sidewall rubbers, positioning the tread assembly and the carcass assembly in coaxial relationship with the unexpanded carcass disposed centrally within the tread assembly, expanding the carcass into engagement with the tread assembly and consolidating the two assemblies together.

A method in accordance with the invention thus forms the tread rubber, breaker and sidewall rubbers as a package, constituting a tread assembly, in a separate operation and normally at a separate location from that at which the carcass is assembled, and in a subsequent operation the carcass assembly and the tread assembly are brought together. Preferably, the method of preparing the tread assembly comprises a step in which the sidewall rubbers are formed to frusto-conical shape with the portions adjacent the tread rubber at a greater diameter than the portions remote from the tread rubber.

According to another aspect of the invention, a building former for a tread assembly comprises an expansible central portion and a pair of expansible side portions, the central portion being arranged to expand to a greater diameter than the side portions so as to hold said side portions in a frusto-conical shape.

A preferred tread assembly former construction comprises an array of segments to form the central portion and separate arrays of segments to form the two side portions, the axially inner ends of the side portion segments having interlocking engagement with associated centre portion segments so that upon expansion of the centre portion segments only the axially inner ends of the side portion segments are carried radially outwardly to provide frusto-conical shaped side portions.

Embodiments of the invention will now be described, by way of example, with reference to the accompanying drawings in which:

FIGS. 13-15 are diagrammatic axial cross-sections which show in greater detail the operation of uniting the tread and breaker assembly with the sidewall rubbers.

Figure 1:
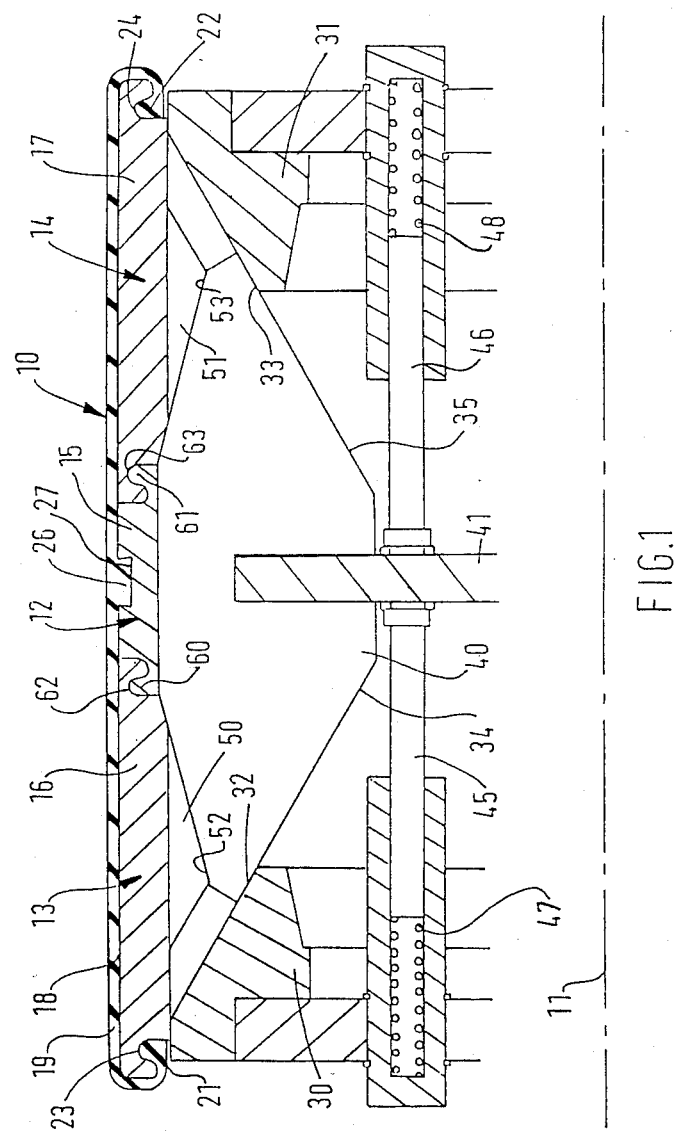
FIG. 1 is a diagrammatic axial cross-section through part of a former in accordance with the invention.

The former 10, part of which is shown in FIG. 1, comprises a central portion 12 and side portions 13,14 which are formed from arrays of segments 15,16,17 respectively and in the collapsed state of the former as seen in FIG. 1 the outer surfaces of these segments constitute a generally cylindrical surface 18 around which a cylindrical rubber sleeve 19 fits closely and is secured in position by annular thickened beads 21,22 which engage corresponding recesses 23,24 in the segments 16,17. The sleeve 19 is anchored in the central region of the former by an inner circumferentially extending dovetail-section rib 26 fitting into a corresponding recess 27 in each of the central segments 15. The sleeve 19, only a half-section of which is shown in FIG. 1, surrounds the assembled segments and tends to hold the segments in the collapsed, cylindrical state as shown in FIG. 1. The former 10 is symmetrical about an axis 11.

Expansion of the former is controlled by a pair of wedge members 30,31 which are axially slidably supported relative to the axis 11 on a central shaft (not shown) and are movable axially towards and away from one another by conventional means (not illustrated), the wedge members having wedge surfaces 32,33 which engage corresponding tapered surfaces 34,35 formed on a set of radially extending plates 40 secured one to each of the central segments 15. The plates 40 are radially slidably mounted on a central plate 41 which constitutes an axially central location means for the former assembly.

Movement of the wedge members 30,31 towards one another is resisted by the action of rods 45,46 and spring assemblies 47,48 which are arranged to urge the members 30,31 axially away from one another and thus to tend to restore the expanded former to the collapsed state as seen in FIG. 1. The segments 16,17 are provided with radially extending plates 50,51 respectively which in the collapsed state of the former abut inclined surfaces 52,53 of the plates 40.

Figure 2:
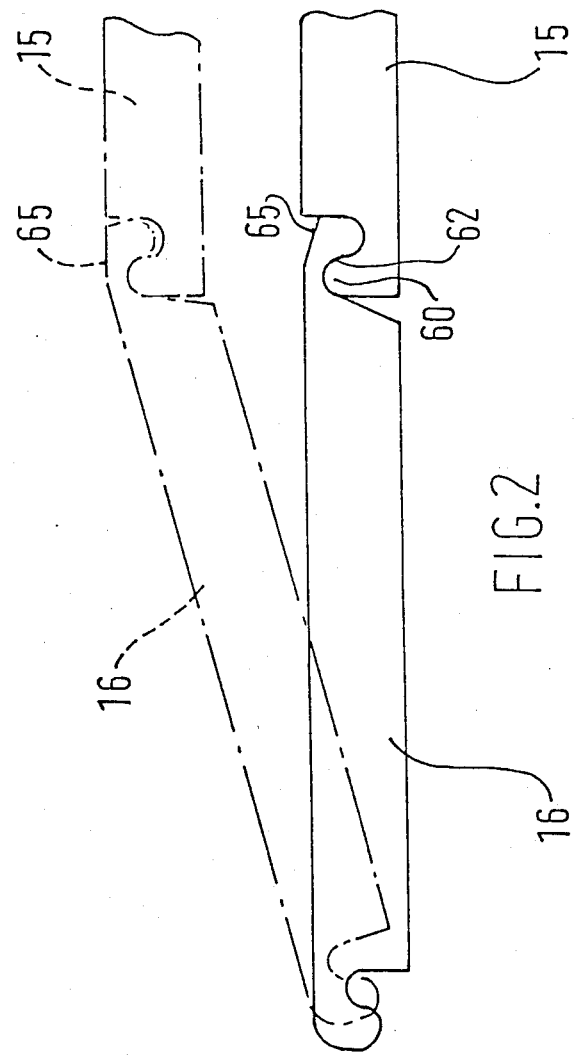
FIG. 2 is a diagrammatic axial cross-section showing part of the former of FIG. 1 in the contracted and expanded states.

The segments 16,17 are hinged at their axially inner ends to the central segments 15 by means of interlocking tongues 60,61 formed on the segments 15 and corresponding grooves 62,63 formed in the segments 16,17 respectively so that when the segments 15 are moved radially outwardly, by the action of the wedge members 30,31 moving axially inwardly, the arrays of segments 16,17 are forced to take up a frusto-conical shape as illustrated in FIG. 2 where the portion shown in dotted lines corresponds to the expanded state of the former. The segments 16,17 have chamfered ends 65 so as to provide a smooth cylindrical surface in the expanded state of the central region of the former.

Figure 3:
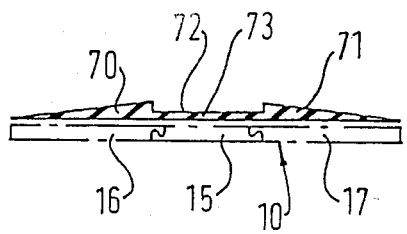
FIGS. 3 to 6 show the operation of the former of FIGS. 1 and 2 in building a tread assembly.
Figure 12:
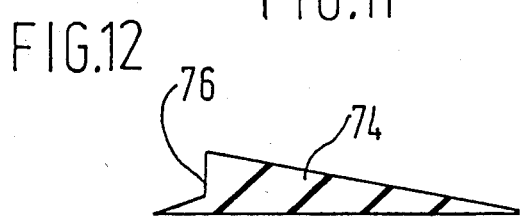
FIG. 12 is a cross-sectional view of a sidewall rubber.

FIG. 3 shows the former 10 in its collapsed, cylindrical, state, and around the former a pair of sidewall rubbers 70,71 have been laid leaving a central gap 72 corresponding to the position of the central part 12 of the former in which a tread and breaker is subsequently to be positioned. The sidewall rubbers may, as illustrated, be extruded in one piece with a central web 73 of thin cross-section holding the two sidewalls together as a single unit to be applied to the former. Alternatively the sidewalls may be applied as separate strips 74 as shown in FIG. 12, having a notched edge to engage and adhere to the tread and breaker.

Figure 4:
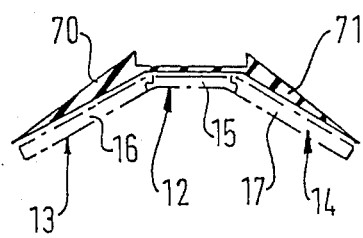

FIG. 4 shows the expansion of the central region 12 of the former which also brings the side portions 13,14 to frusto-conical shape and imposes the same shape on the sidewall rubbers, stretching the axially inner edges of the sidewall rubbers to the diameter at which the tread and breaker are to be incorporated.

Figure 5:
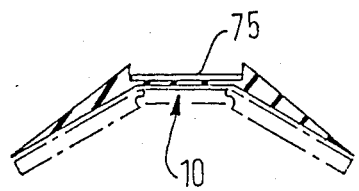
Figure 6:
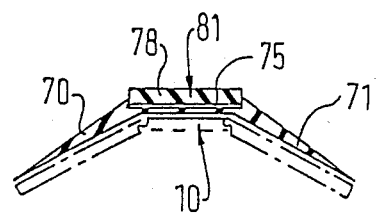

In FIG. 5, a breaker 75 has been built on to the sidewall rubbers, and in FIG. 6 a tread rubber strip 78 has been applied over the breaker 75 and with its edges consolidated in contact with the sidewall rubbers 70,71 by conventional techniques. The former 10 now carries a complete tread assembly 81 which is shaped appropriately to be united with a shaped tire(s) carcass.

Figure 7:
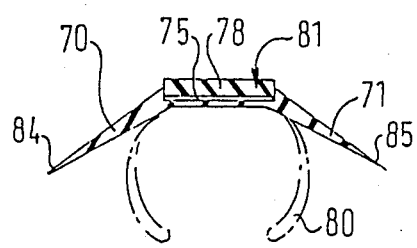
FIG. 7 shows a tread assembly united with a carcass.
Figure 8:
FIGS. 8 to 11 show an alternative method of building a tread assembly employing a former as shown in FIGS. 1 and 2.
Figure 9:
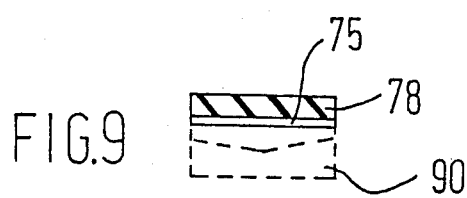
Figure 10:
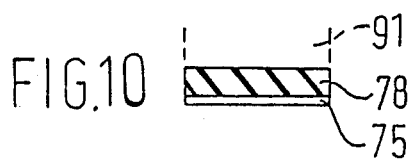

FIG. 7 shows the shaping of a tire(s) carcass 80 into the tread assembly 81 made by the method described with reference to FIGS. 3 to 6. In order to transfer the tread assembly 81 from the former as shown in FIG. 6 to a carcass 80 as shown in FIG. 7, a conventional carrier ring may be used, the former 10 being expanded slightly to bring the tread rubber into engagement with the inner surface of the carrier ring, the former 10 then being collapsed to leave the tread assembly 81 in the carrier ring, and the carrier ring then being moved axially to surround the unshaped carcass 80 in a position which is located accurately centrally with respect to the carcass. The carcass 80 is then expanded to toroidal form as shown in FIG. 7, and it will be noted that the sidewall rubbers 70,71, being of frusto-conical shape at this stage, are in a state which is particularly suitable to be spun down, and then consolidated in the usual manner. It is thus possible to apply the inner edges 84,85 of the sidewall rubbers against the bead regions of the carcass without undue creasing, which would inevitably occur if this operation were to be attempted using a tread/breaker/sidewall package in which the sidewall rubbers extended generally axially in line with the tread and breaker. By arranging for the sidewalls to take up a frusto-conical shape, less material is present at the inner edges 84, 85 and the spinning down operation becomes practicable.

FIGS. 8 to 11 illustrate diagrammatically an alternative method to that shown in FIGS. 3 to 7.

Figure 11:
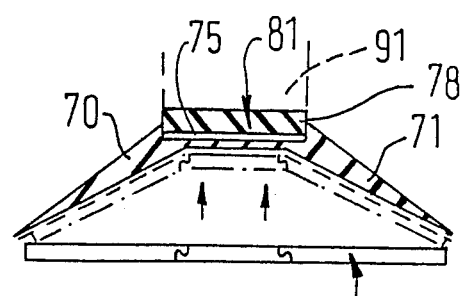

In the method shown in FIGS. 8 to 11 the breaker 75 is built initially on a separate breaker former 90. The tread rubber 78 is then applied to the breaker 75, and by slight expansion of the former 90 the tread rubber 78 and breaker 75 are transferred as a unit into a conventional transfer ring 91. The transfer ring 91 is then moved to a position surrounding the former 10 which is shown in FIG. 11 both in the cylindrical (full lines) and the expanded (dotted lines) states, and the former 10 is operated as previously explained with reference to FIGS. 3 and 4 to bring sidewall rubbers 70,71 into engagement with the tread rubber 78 and breaker 75 to form the complete tread assembly as shown. The package 81 is then transferred in the carrier ring 91 to a tire(s) carcass 80 as already illustrated in FIG. 7, the carrier ring 91 is removed, and the assembly consolidated as previously described.

In both of the methods described above, and particularly where the sidewalls are in separate strips 74 as shown in FIG. 12, it is desirable that the shoulder 76 of each strip 74 is pressed into engagement with the adjacent edge of the tread rubber to ensure that the completed tread assembly has the sidewalls secured firmly in position for subsequent transport and tire(s) assembly operations. To achieve this the apparatus described may be constructed so as to have an inherent tendency to cause a slight rotation of the sidewall strip towards the tread about axes tangential to the former 10, for example by omitting the chamfers on the ends of the segments 16,17 so as to cause a radial projection of these ends upon expansion of the former and thus tilt the shoulders 76 towards the tread rubber. This tilting effect can also be produced (or enhanced) by constructing the central portion of the former so that it can yield radially inwardly when the expansion of the former presses the tread/breaker assembly against its carrier ring, the radially inward movement of the central part of the former relative to the adjacent parts of the side portions producing the desired rotation of the sidewall edges.

FIGS. 13–15 show the action of a former of the general kind illustrated in FIGS. 1 and 2 to cause a slight rotation of the sidewall strip 71 towards the tread 78 (the breaker 75 is omitted from these drawings for clarity).

The centre portion segments 115 and side portion segments 114 have interlocking tongues 161 and grooves 163 respectively and the ends 165 of the segments 114 are chamfered as shown, a cylindrical rubber sleeve 119 being fitted around the assembly of segments.

FIG. 13 shows the unexpanded state of the former, and FIG. 14 shows the state where a lip 77 of the sidewall rubber 74 engages the breaker/tread assembly. As shown in FIG. 14, the segments 114 have been designed to be tilted to such an angle relative to the segments 115 that the lip 77 has been brought into contact with the breaker/tread assembly while the shoulder 76 is not yet engaged with the tread rubber 78. By suitable choice of dimensions it can be arranged for the tip of the lip 77 to make contact first, further expansion of the former causing a rolling action which expels air from the joint between the lip 77 and breaker/tread assembly as the joint is formed.

Continued expansion of the central segments 115, to the position shown in FIG. 15, causes the outer segments 114 to be moved radially outwards to a greater extent at their axially outer ends (the inner ends 165 being held from further outward movement by the constricting effect of the carrier ring 91) and the segments 114 tilt about the pivots provided by the tongues 161 to roll the shoulder 76 of the sidewall rubber 74 into engagement with the side of the tread rubber 78.

Figure 16:
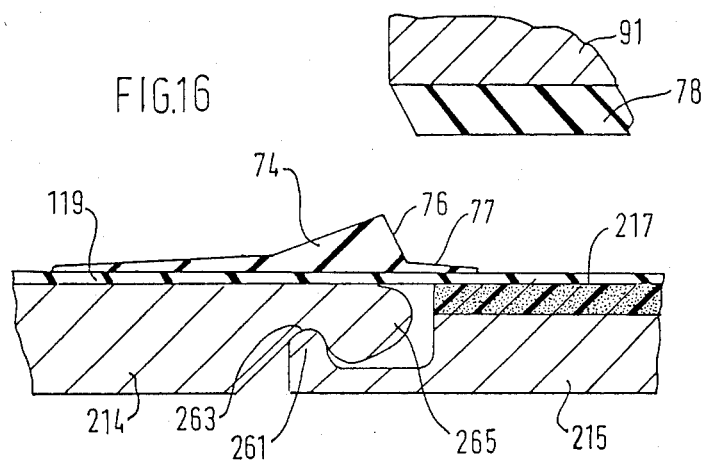
FIGS. 16-18 are corresponding views to FIGS. 13-15 showing the operation of a modified former.
Figure 17:
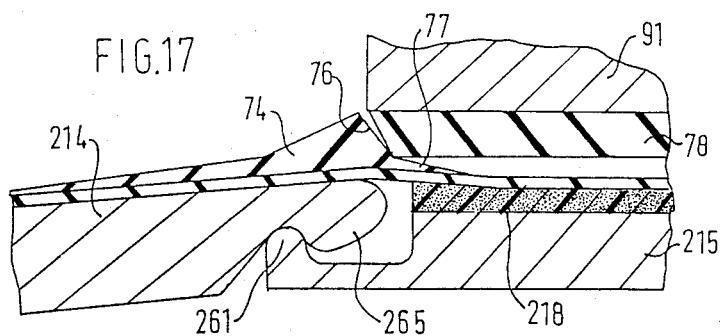
Figure 18:
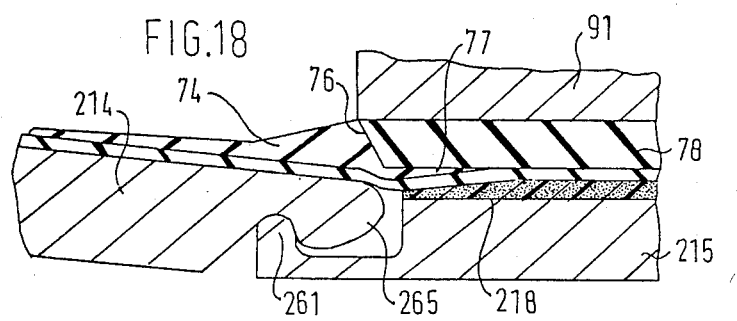

FIGS. 16-18 show the action of a former, of the general kind illustrated in FIGS. 1 and 2 but having a yielding central portion, in applying a sidewall strip 74 to a tread/breaker assembly (only the tread 78 being shown, for clarity).

The centre portion segments 215 and side portion segments 214 have interlocking tongues 261 and grooves 263 respectively, but the ends 265 of the segments 214 are rounded rather than chamfered as in the embodiment of FIGS. 13-15. The centre portion segments 215 are provided with an outer layer 217 of compressible material such as a plastic foam, with the object of causing a rotational movement of the lip 77 and shoulder 76 of the sidewall rubber strip 74 during the final stages of expansion of the former.

As shown in FIG. 17, the initial contact has been made between the tread/breaker assembly and the sidewall rubber 76, and the underlying side region 218 of the foam material is not compressed. By further radially outward movement of the segments 215 a gradual compression of the foam material in the side region 218 take place and the lip 77 is rolled into engagement with the underside of the tread/breaker assembly as shown in FIG. 18, expelling air as the contact between the lip 77 and the lower surface of the breaker extends axially inwardly.

On further radial expansion of the centre portion segments with compression of the foam layer 217, since the ends 265 of the segments 214 are trapped within the ring 91 the segments 214 tilt about pivots provided by the tongues 261 as shown in FIG. 18, progressively rolling the shoulder 76 into contact with the side of the tread rubber 78, with expulsion of air from between the progressively contacting surfaces as before.

By the use of the methods and apparatus in accordance with the invention as described above a tread assembly is provided which incorporates the sidewall rubbers and is thus particularly suitable for subsequent automatic operations to complete the building of the tire(s). Since the sidewall rubbers are accurately located relative to the tread rubber and breaker at a building stage where these components are themselves accurately located and subject to precise dimensional control the accuracy of the final assembly and consolidation operations of the tire(s) carcass is greatly improved and more easily carried out by automatic machinery than would be the case if conventional methods were used to apply the sidewall rubbers to the shaped carcass.

In the apparatus described, it will be noted that only the centre portion segments are directly actuated for expansion and contraction of the former by a single wedge mechanism, the side portion segments being arranged to follow the action of the centre portion segments by their interengaging tongues and grooves. By means of the mechanisms described with reference to FIGS. 13-18 it has been found possible to control the tilt of the side portion segments so as to achieve the required sidewall/tread joint consolidation, still without providing any separate actuating system for the side portion segments. The use of a single actuating mechanism for the whole former is particularly advantageous in that it facilitates the installation of the former in a turret for automatic tire(s) building operations, only one mechanical connection being required to operate the former.

In order to use a former in accordance with the invention in automatic transfer machinery employing carrier rings which support within them pre-formed sidewalls in cylindrical form, additional means may be provided for expanding the side portions 13,14 (after they have been located within the sidewalls) to engage the sidewalls and transfer them to the former. The side portions are preferably maintained in cylindrical form as they expand to pick up the sidewalls, and this initial cylindrical expansion can be achieved by providing additional wedge surfaces (not shown) on the wedge members which engage similar surfaces on the side portions and have the same cone angle as the surfaces 32,33 which raise the central segments, but are axially short relative to the surfaces 32,33. After a predetermined radial expansion of the side portions together with the central portion in cylindrical form, the additional wedge surfaces terminate and the expansion then continues as described above with the former then assuming a barrel shape as previously described.

Relative to alternative conventional methods in which the sidewall rubbers are applied to the carcass in the cylindrical state of the carcass, before shaping, the method in accordance with the invention has the advantage that it provides improved accuracy in the placement of the sidewall rubbers in the important shoulder areas of the tire(s), i.e. adjacent the breaker edges.

I claim:

1. A method of building a pneumatic tire comprising separately building an unexpanded carcass assembly and an annular tread assembly comprising tread rubber, breaker reinforcement and sidewall rubbers wherein the sidewall rubbers are separate and are each formed with a notched edge to engage and adhere to the tread and breaker, positioning the tread assembly and the carcass assembly in coaxial relationship with the unexpanded carcass disposed centrally within the tread assembly, expanding the carcass into engagement with the tread assembly and consolidating the two assemblies together.

2. A method according to claim 1 wherein the sidewall rubbers are arranged to be rotated into contact with the sides of the tread rubber.

3. A method of building a radial ply pneumatic tire comprising:
building an unexpanded radial carcass assembly;
separately building an annular tread assembly comprising tread rubber and breaker reinforcement built onto sidewall rubbers which sidewall rubbers are frusto-conical in cross section with the portions adjacent the tread rubber at a greater diameter than the portions remote from the tread rubber;
then positioning the tread assembly and the carcass assembly in coaxial relationship with the unexpanded carcass disposed centrally within the tread assembly;
and then expanding the carcass into engagement with the tread assembly and consolidating the two assemblies together.

4. A method of building a pneumatic tire comprising separately building an unexpanded carcass assembly and an annular tread assembly comprising tread rubber, breaker reinforcement and sidewall rubbers wherein the breaker and tread rubber are built as a unit and transferred into a transfer ring which is then arranged to surround the sidewall rubbers, the sidewall rubbers then being expanded to frusto-conical shape with the portions adjacent the tread rubber at a greater diameter then the portions remote from the tread rubber so as to be united with the tread rubber and breaker, positioning the tread assembly and the carcass assembly in coaxial relationship with the unexpanded carcass disposed centrally within the tread assembly, expanding the carcass into engagement with the tread assembly and consolidating the two assemblies together.

* * * * *